April 23, 1957    H. W. O'DELL ET AL    2,790,084
X-RAY MEASURING DEVICE

Filed March 8, 1954      2 Sheets-Sheet 1

INVENTORS
HARRY W. O'DELL &
PAUL L. WEYGANDT
BY
Oldham & Oldham
ATTORNEYS

April 23, 1957  H. W. O'DELL ET AL  2,790,084
X-RAY MEASURING DEVICE

Filed March 8, 1954  2 Sheets-Sheet 2

INVENTORS
HARRY W. O'DELL &
PAUL L. WEYGANDT
BY
Oldham & Oldham
ATTORNEYS

United States Patent Office 2,790,084
Patented Apr. 23, 1957

2,790,084
X-RAY MEASURING DEVICE

Harry W. O'Dell and Paul L. Weygandt, Akron, Ohio

Application March 8, 1954, Serial No. 414,796

10 Claims. (Cl. 250—59)

This invention relates to X-ray apparatus and particularly to apparatus for use in taking X-ray pictures to facilitate reading the X-ray pictures taken by the machine.

Heretofore when a doctor or other trained person is reading an X-ray, the question of the accurate size of the bone or organ, or other portion of the picture being studied is a very important matter. For example, in setting a broken bone, knowledge of the exact distance of separation of the broken bones is a factor that would facilitate the setting of the bone. However, in X-rays as taken today, it is very difficult, if not impossible, to have any accurate estimate of the size of the particular part of the X-ray picture being examined.

It will be realized that most X-ray apparatus in use today has some type of an adjustable head which is moved varying distances from the subject of a picture in order to take the desired size of picture and to avoid injury or burn by the X-rays used in taking the picture.

It is the general object of the present invention to provide a novel type of apparatus suited for attachment to an X-ray machine wherein a scale indicating means is provided on the apparatus and appears in any picture taken thereby to produce an accurate measurement of the bones, or other members appearing in the X-ray picture produced.

A further object of the invention is to provide apparatus wherein a scale or measurement indicating member is constantly maintained at a fixed relationship between the focal point of an X-ray machine and the specific member of which an X-ray picture is being taken.

A further object of the invention is to provide a plurality of types of movement controlling means connecting a pointer and scale means to an X-ray machine frame to permit adjustment of the position of the pointer member but to maintain the scale indicating means at a fixed relationship to such pointer and the X-ray head or machine.

A further object of the invention is to provide a relatively inexpensive but sturdy type of apparatus for use in conjunction with an X-ray machine to facilitate the accurate size reading of objects shown in the pictures taken thereby.

The foregoing and other objects and advantages of the invention will be made more apparent as the specification proceeds.

For a better understanding of the present invention, reference now should be had to the details of the structure shown in the accompanying drawings wherein one currently preferred embodiment of the principles of the invention is shown and wherein.

Figure 1:
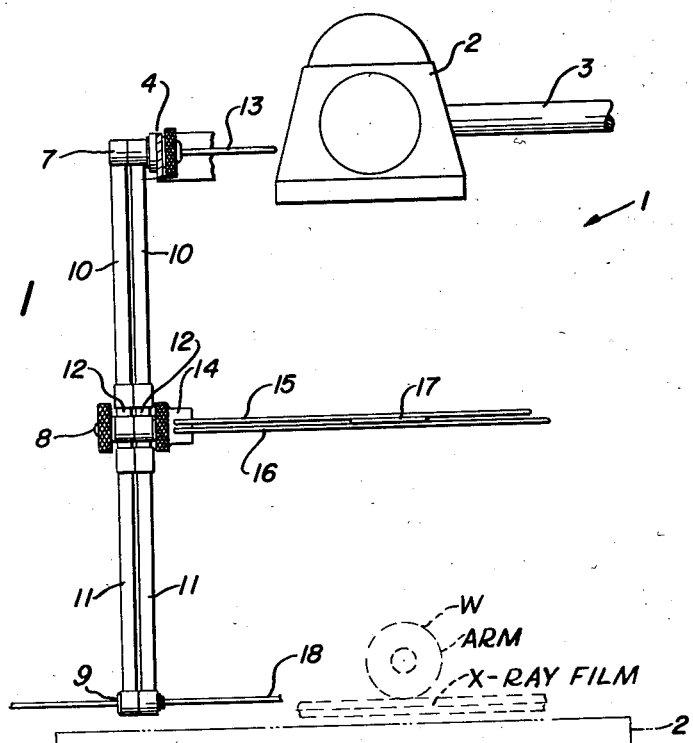
Fig. 1 is a side elevation, partially broken away and shown in section of the apparatus of the invention shown in conjunction with the X-ray head of an X-ray machine.
Figure 2:
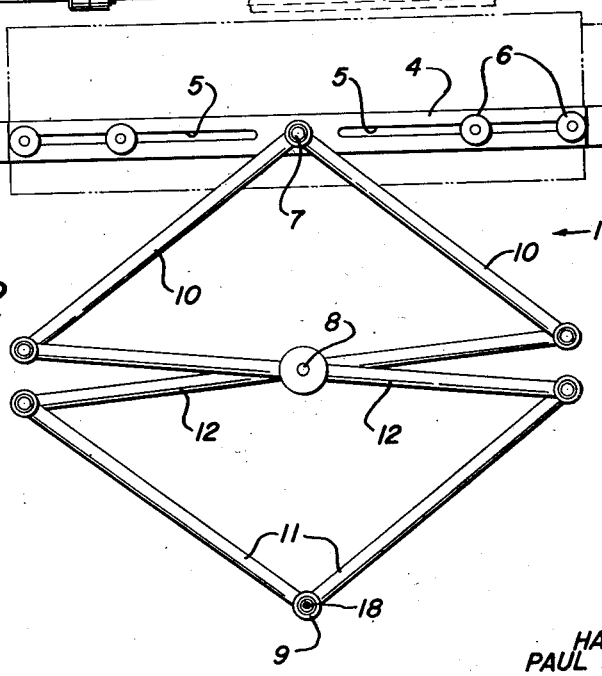
Fig. 2 is a front or left side elevation of the apparatus of Fig. 1 with the X-ray head being indicated in chain dotted lines therein.

The present invention relates to the combination of certain apparatus with an X-ray machine and with the apparatus attached to the machine comprising a frame means fixedly positioned with relation to the focal point of the machine, scale holding means, a scale with marks thereon that register in an X-ray picture being carried by the scale holding means, an X-ray impervious pointer means, and means movably connecting the scale holding means and the pointer means to the frame means so as to position the pointer means and scale in the X-ray field of the machine. These last movement connecting means maintain the scale in fixed relation to the pointer means from the focal point of the machine so that an accurate size indication appears on all X-ray pictures taken by the machine.

When referring to the accompanying drawings and the following specification, corresponding numerals will be used to refer to corresponding parts to facilitate comparison between such different parts of the application.

Reference now should be had to the details of the structure shown in the drawings, and X-ray measuring apparatus of the invention is indicated as a whole by the numeral 1. This X-ray measuring apparatus 1 of the invention is used in combination with and is secured to a head 2 of a conventional X-ray machine, a support arm 3 of which is shown. This head 2 usually is movably positioned and the X-ray measuring device 1 of the invention will move therewith by means to be described hereinafter in detail. The means (not shown) used to position a patient with relation to the head 2 of the X-ray machine also usually are adjustably positioned so that the particular portion of the body to be X-rayed may be located at a desired distance from the head 2 to secure the proper size and strength of an X-ray picture.

Figure 3:
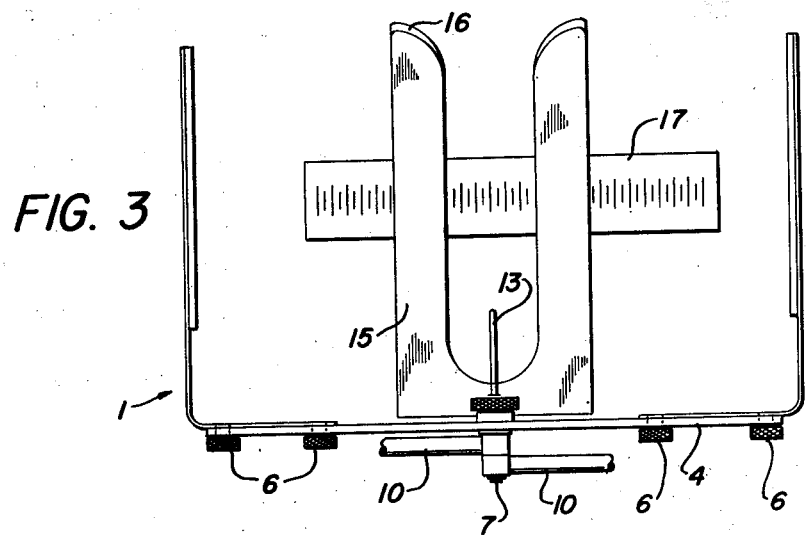
Fig. 3 is a plan view of the apparatus of Fig. 1 with the X-ray head removed.

The measuring apparatus of the invention includes a frame 4 that may be of substantially U-shape, as shown in Fig. 3, and with such frame 4 being secured to the head 2 of the X-ray machine in any desired manner so as to be fixedly positioned with relation thereto. Usually the frame 4 has elongate slots 5 therein and cap screws 6 extend through these slots and secure end portions of the frame 4 thereto so that the frame is adjustable in width and can be easily clamped to any conventional size of head for an X-ray machine. Other conventional means, as desired, may secure the frame 4 to the head 2.

The X-ray measuring apparatus 1 of the invention is shown as including conventional lazy tong means that include an upper pivot pin, or fulcrum 7, a center pivot member or fulcrum 8 and a bottom pivot or fulcrum 9. Pairs of arms 10, 10 and 11, 11 are pivotally connected to and extend from the upper fulcrum 7 and the lower fulcrum 9, respectively. A pair of center arms 12 pivotally engage the center fulcrum 8 and pivotally connect at their outer ends to conventional pivotal means carried by the ends of the arms 10 and 11 to connect the free ends of such arms through the center fulcrum 8 and center arms 12. The particular lazy tong means of the invention shown provide a fixed relationship between the center fulcrum 8 and the lower fulcrum 9 and with the center fulcrum 8 constantly being maintained at one-half the distance of the lower fulcrum 9 from the upper fulcrum 7.

In some instances, it is desirable to have some type of a pointer member or finger 13 operatively carried by the upper fulcrum 7 in alignment therewith so that such finger 13 is in alignment with and points to the focal point of the head 2 of the X-ray machine. Thus the upper fulcrum 7 can be exactly aligned with and be centered on such focal point so that the center fulcrum 8 and lower fulcrum 9 are maintained in desired adjustable but constant relationship to such focal point.

The center fulcrum 8 has associated therewith a bracket or holder member 14 used for positioning a scale or indicator means in the apparatus. The bracket 14 has a pair of spaced but parallel slots provided therein in which a scale indicating means, such as U-shape members 15 and 16, are positioned in spaced, parallel relation. These U-shape members 15 and 16 are adapted to position a suitable scale or indicator bar 17 slidably therebetween in order that such scale can be properly located with relation to any desired X-ray picture being taken by the apparatus.

The lower fulcrum 9 has a suitable pointer 18 adjustably positioned thereby. The pointer 18 usually can be moved axially so that it can protrude out if desired into the X-ray field produced by the X-ray head 2 when in operation and point out or mark the particular object to be located in the X-ray picture. The pointer 18 should be of such material as to register in an X-ray picture.

It will be realized that any marking appearing upon the scale 17 should be made of such material as to register upon an X-ray film and appear in the picture produced thereby. By calibrating the scale 17 properly with relation to its fixed position with regard to the X-ray head 2 and the pointer 18, the indicator means on the scale 17 will appear as accurate measurements upon the X-ray picture taken. Thus the scale can be calibrated to read in centimeters, inches or other desired units and all pictures taken by the X-ray machine 3 when the apparatus of the invention is associated therewith will have appearing directly on the X-ray picture an accurate size indication for use in reading the picture.

Figure 4:
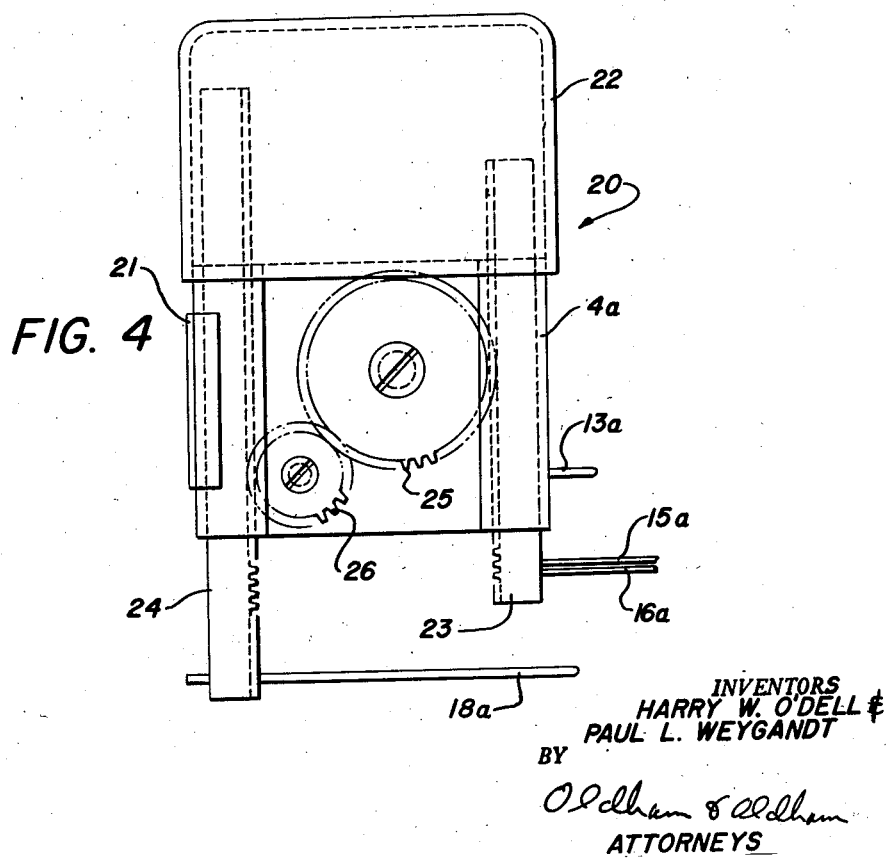
Fig. 4 is a side elevation of a modification of the apparatus of the invention.

A modified X-ray measuring apparatus of the invention is shown in Fig. 4 and is indicated as a whole by the numberal 20. In this apparatus of the invention, a frame 4a is provided and it has a suitable positioning bracket 21 secured to the frame 4a and used to position the apparatus on some suitable anchoring member. Usually some conventional type of an end cap, or cover member 22 is carried by the frame 4a to enclose some of the movable parts of the apparatus 20.

The frame 4a slidably, or movably positions a pair of conventional racks 23 and 24 therein in any desired manner, and the lower ends of each of these racks 23 and 24 protrude from the lower portion of the frame 4a. Usually the rack 24 protrudes appreciably farther from the frame 4a than the rack 23 for a purpose to be hereinafter described. A finger 13a is provided on a portion of the frame 4b and it is used to locate the apparatus 20 accurately with such finger 13 pointing to and being in alignment with the focal point of any X-ray machine with which such apparatus 20 is used. Thus the bracket 21 can be secured to an X-ray machine itself, if the X-ray head is fixably positioned, or it may be secured to the movable portion of the X-ray apparatus so that the finger 13a is maintained in alignment with the X-ray head, if movably positioned. Scale holding means, such as U-shaped members 15a and 16a are suitably secured to the rack 23 and extend therefrom into the X-ray field of any machine with which the apparatus is associated. A pointer 18a is adjustably carried by the rack 24 at a lower end thereof and it likewise normally extends into the X-ray picture field.

In order that the pointer 18a and any scale 17a carried by the bracket means 15a and 16a are maintained in desired fixed relationship to each other, they connect to unitary movement means controlling both the racks 23 and 24. In other words, as relative movement of the pointer 18a with relation to the frame 4a occurs, the members 15a and 16a and any scale means carried thereby will be maintained in constant relationship to such pointer 18a with reference to the distances of the scale and pointer 18a from the finger 13a and the focal point of the X-ray machine.

The particular movement controlling means used in the apparatus 20 in this instance is shown as comprising a relatively large diameter gear 25 journaled in the frame 4a and engaging the rack 23, and a relatively small diameter gear 26 journaled on the frame 4a and engaging the rack 24. The gear 26 has one-half the diameter of the gear 25 and the teeth of the gears intermesh so that the racks 23 and 24 will have a fixed but positive ratio of movement with relation to each other and with the rack 24 in this embodiment being moved twice as far as the rack 23 by the gear means connecting such two members. Usually the apparatus is adapted to maintain any given position and to be moved manually to any new position when desired.

In some instances, no special pointer member may be provided in the apparatus and the lower end of the rack 24 might serve as such member, or the lower pivot 9 would so serve.

A patient W is indicated in Fig. 1 of the drawings and is shown as the article being X-rayed. A conventional X-ray film is indicated at Z and is positioned in a conventional manner with relation to the remainder of the apparatus.

From the foregoing it will be seen that special attachment apparatus has been provided for use with an X-ray apparatus or machine. These X-ray measuring means of the invention are adapted to simplify and facilitate the reading of X-ray pictures taken by apparatus of the invention and wherein scale or measurement indicating means will appear directly upon the X-ray picture taken. The apparatus is relatively sturdy and easily maintained so that it can have a long operative life with a minimum of maintenance thereon. The scale indicator means can be readily adjusted in position to appear in the X-ray picture taken and given the desired size reading thereon. Thus it is contended that the objects of the invention have been achieved.

While several complete embodiments of the invention have been disclosed herein, it will be appreciated that modification of these particular embodiments of the invention may be resorted to without departing from the scope of the invention as defined in the appended claims.

What is claimed is:

1. Apparatus for use with an X-ray machine having an X-ray head and comprising a frame for being secured to an X-ray head, lazy tong means including a pair of end fulcrums and a center fulcrum and arm means connecting the center fulcrum to the end fulcrums for related movement of the fulcrums, means securing said lazy tong means to said frame with one end fulcrum corresponding to the focal point of said X-ray head, holding means operatively associated with said center fulcrum, scale means carried by said holding means to be positioned in the area subjected to X-rays by said X-ray head, and pointer means carried by said other end fulcrum and projecting into the X-ray field from said X-ray head whereby said pointer means and said scale means and the focal point of said X-ray head are maintained in fixed relation to each other upon movement of said pointer means towards and from said X-ray head.

2. Apparatus for use with an X-ray machine having an X-ray head for producing an X-ray field and comprising a frame for being secured to an X-ray head, lazy tong means including a pair of end pivots and a center pivot, a plurality of arms connecting said end and center pivots, means securing one end pivot to said frame at the focal point of said X-ray head, a bracket secured to said center pivot and extending out into the X-ray field, scale means having marker means thereon registering on an X-ray picture carried by said bracket to be positioned in the X-ray field of said X-ray head, and pointer means which register on an X-ray picture carried by said other end pivot and projecting into the X-ray field whereby said pointer means and said scale means and the focal point of said X-ray head are maintained in fixed relation to each other to provide a measurement appearing in the X-ray picture even upon movement of said pointer means.

3. Apparatus for use with an X-ray machine having an X-ray head and comprising a frame for being secured to an X-ray head, lazy tong means including a pair of end pivots and a center pivot, means securing one end pivot to said frame in alignment with the focal point of said X-ray head, a bracket secured to said center pivot, scale means carried by said bracket to be positioned in the area subjected to X-rays by said X-ray head, and pointer means carried by said other end pivot and projecting into the X-ray field from said X-ray head whereby said pointer means and said scale means and the focal point of said X-ray head are maintained in fixed relation to each other even upon movement of said pointer means.

4. In combination, an X-ray machine having a focal point, frame means fixedly positioned with relation to said focal point, scale holding means, pointer means, and means movably connecting said scale holding means and said pointer means to said frame means and positioning such means in the X-ray field of said machine, said last named means maintaining said scale holding means in fixed relation to said pointer means from the focal point of said machine and intermediate and spaced from both said pointer means and the focal point of said machine even with relative movement of said pointer means to said machine.

5. In combination, an X-ray machine having a focal point, frame means held in a fixed position corresponding to said focal point, scale holding means, bone pointer means, means movably connecting said scale holding means and said bone pointer means to said frame means, and a scale member on said scale holding means and positioned in the X-ray field of said machine, said last named means maintaining said scale holding means at one half the distance of said bone pointer means from the focal point of said X-ray machine upon relative movement of said bone pointer means to said X-ray machine to produce an accurate size measurement directly on the X-ray picture taken.

6. In combination, an X-ray machine having a focal point, frame means fixedly positioned with relation to said focal point, scale holding means, a scale with marks thereon that register in an X-ray picture, X-ray impervious pointer means, and means movably connecting said scale holding means and said pointer means to said frame means and positioning said pointer means and scale in the X-ray field of said machine, said last named means maintaining said scale in fixed relation to said pointer means from the focal point of said machine and intermediate and spaced from both said pointer means and the focal point of said machine.

7. In combination, an X-ray machine having a focal point, frame means fixedly positioned with relation to said focal point, scale holding means, a scale with marks thereon that register in an X-ray picture, X-ray impervious pointer means, a rack movably carried by said frame means and positioning said scale holding means, a second rack movably carried by said frame means and positioning said pointer means, and gear means connecting said racks together whereby movement of one of said racks positively moves the other of said racks and maintains said scale and pointer means in fixed relation to each other with reference to the focal point of said X-ray machine.

8. Apparatus for use with an X-ray machine, which apparatus comprises frame means, scale holding means, pointer means, a rack slidably carried by said frame means and positioning said scale holding means spaced from said frame means, a rack slidably carried by said frame means and positioning said pointer means spaced from said frame means, and means connecting said racks for unitary and proportionate movement thereof to maintain said scale holding means in fixed relation to said pointer means with relation to a portion of said frame upon movement of said scale holding means and pointer means.

9. In combination, an X-ray machine having a focal point, frame means held in a fixed position corresponding to said focal point, scale holding means, bone pointer means, means movably connecting said scale holding means and said bone pointer means to said frame means to permit said bone pointer means to be positioned in the center plane of any object being X-rayed, said scale holding means being intermediate said focal point and said bone pointer means, and a scale member on said scale holding means and continually positioned in the X-ray field of said machine, said last named means maintaining said scale holding means at a fixed ratio to the distance of said bone pointer means from the focal point of said X-ray machine upon relative movement of said bone pointer means to said X-ray machine to produce an accurate size indication directly on the X-ray picture taken.

10. Apparatus for use with an X-ray machine having an X-ray head and comprising a frame for being secured to an X-ray head, lazy tong means including a pair of end fulcrums and a center fulcrum and arm means connecting the center fulcrum to the end fulcrums for related movement of the fulcrums, means securing said lazy tong means to said frame with one end fulcrum corresponding to the focal point of said X-ray head, holding means positioned of the axis of said center fulcrum, scale means carried by said holding means on the axis of said center fulcrum to be positioned in the area subjected to X-rays by said X-ray head and having X-ray impervious marking thereon, and pointer means carried by said other end fulcrum and projecting into the X-ray field from said X-ray head whereby said pointer means and said scale means and the focal point of said X-ray head are maintained in fixed relation to each other upon movement of said pointer means towards and from said X-ray head and said marking on said scale means appears on any X-ray picture taken.

References Cited in the file of this patent

UNITED STATES PATENTS

| | | |
|---|---|---|
| 1,396,920 | Brostrom | Nov. 15, 1921 |
| 1,735,726 | Bornhardt | Nov. 12, 1929 |
| 2,650,308 | Catlin | Aug. 25, 1953 |